May 30, 1950        W. F. MITCHELL        2,509,444

FLUID COUPLING

Filed June 17, 1947        3 Sheets-Sheet 3

INVENTOR.
Wallace F. Mitchell,
BY
Atty's

Patented May 30, 1950

2,509,444

UNITED STATES PATENT OFFICE 2,509,444

FLUID COUPLING

Wallace F. Mitchell, Chicago, Ill., assignor to
M B G Corporation, Chicago, Ill., a corporation
of Illinois Application June 17, 1947, Serial No. 755,134

19 Claims. (Cl. 284—19)

My invention relates to fluid couplings and has to do particularly with a self-sealing, break-away coupling for connecting two sections of a fluid conduit or line and adapted to separate under predetermined tension on the conduit to prevent damage to the conduit and the associated apparatus and to close and seal the free ends of the separated conduit sections.

An object of my invention is to provide an improved coupling of the foregoing character.

Another object is to provide a self-sealing, separable coupling for a fluid line which is capable of separating solely upon the application of predetermined tension on the line and which upon separation automatically closes the free ends of the separated sections of the line with a minimum loss of fluid from the line.

Another object is to provide a separable fluid coupling which automatically locks itself releasably in coupling condition when the coupling members are moved into coupling position and does not require the additional manipulation of any locking device.

Another object is to provide a separable coupling for a fluid line wherein the fluid pressure in the line is utilized to aid in maintaining the coupling in connected condition.

A further object is to provide a separable coupling for a fluid line in which the line pressure is utilized to aid in holding the coupling in connected condition but wherein the coupling is maintained in connected condition even when there is no fluid pressure in the line.

Still a further object is to provide a separable fluid coupling wherein the line pressure is employed to aid in holding the coupling in connected condition but which coupling separates upon the application of a predetermined tension on the line regardless of the amount of pressure in the line.

A further object is to provide a separable coupling for two sections of a fluid line which may be manually connected with the use of a relatively small force even when the fluid in the line is under a relatively high pressure.

Still a further object is to provide a self-sealing, separable coupling for a fluid line having valves for automatically closing the ends of the separated line sections when the coupling is disconnected wherein the valves are concealed and protected against damage such as might be caused for example by the adherence of dirt or other foreign matter to the valves or by striking the valves against the ground or other objects.

A still further object is to provide a coupling of the character described which is simple and rugged in construction, relatively easy and inexpensive to manufacture and which is reliable in operation and capable of use for a long period of time without adjustment or replacement of parts.

Other objects of the invention are to provide a self-sealing, separable fluid coupling which when disconnected securely closes the ends of the line sections against loss of fluid and which when in coupling condition fully seals the line against leakage; which does not require any adjustments before or during use; which has no highly critical dimensions and which, therefore, will continue to operate satisfactorily even should substantial wear take place in the bearing surfaces; which can be readily disassembled for repair or replacement of parts should such become necessary by reason of exceptional abuse of the coupling; which lends itself readily to manufacture in a large variety of different sizes and forms for various installations but which for any particular use may be made relatively small and compact; which is positively locked in coupling position and does not depend upon fluid pressure or friction for this purpose; which, after separation, does not require replacement or readjustment of parts to effect recoupling but may be reconnected merely by bringing the coupling members into coupling position; and which initiates the separation of the coupling members immediately upon application of a predetermined tension on the fluid line and completes the separation rapidly to thereby prevent any damage to the line or to the connected apparatus.

Other objects and advantages of my invention will appear from the following description taken in connection with the appended drawings in which.

The present invention is suitable for use in coupling two sections of a fluid line or conduit and is particularly suitable for use in a line where it is desired that the coupling separate when excessive tension is applied to the line, in order to avoid damage to the line or to the apparatus to which it is connected. One example of such use is in connection with tractor-drawn farm implements such as plows, harrows, cultivators and the like, wherein the earth-engaging portions of the implement are raised and lowered by a hydraulic control device which includes a cylinder carried on the implement and connected through a hydraulic line to a hydraulic pump or air compressor carried on the tractor for maintaining a suitable operating pressure in the hydraulic cylinder. In such apparatus the traction connection between the tractor and the implement is provided with a separable connection which separates automatically when the implement encounters excessive resistance, as for example, where the plow strikes a large obstruction such as a stump or a rock. It is also desirable that the hydraulic line be instantly separable to prevent damage to the line and the connected apparatus when the traction connection separates.

While the present invention provides a self-sealing break-away coupling which is especially well suited for use in a hydraulic line forming a portion of a hydraulic control system for tractor-drawn farm implements it will be understood that the invention is not limited to such application but is suitable for many different uses where a coupling having the described characteristics is desired. However, at least one section of the line and preferably the section connected to the plug body is of flexible construction to permit relative rotation between the two coupling members.

Figure 4:
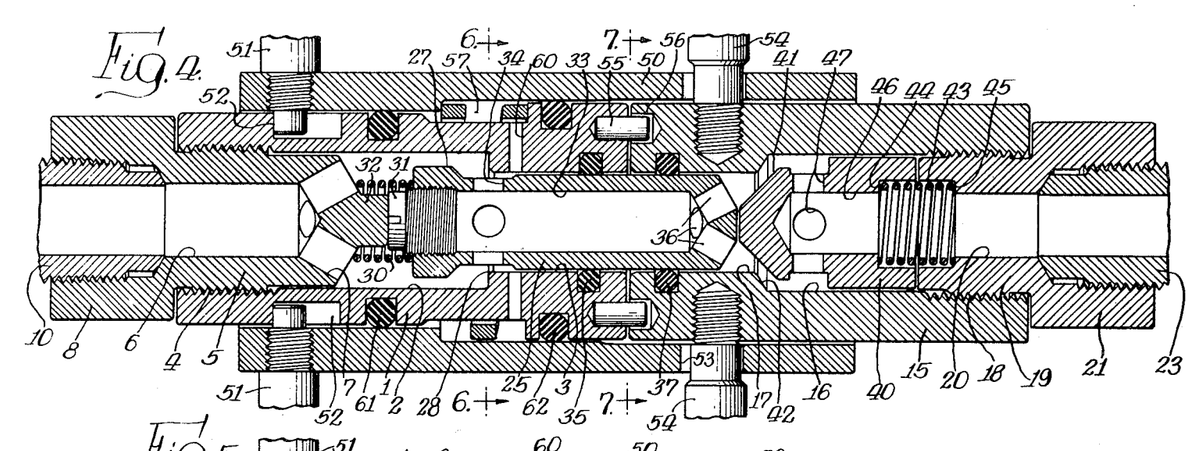
Fig. 4 is an enlarged, longitudinal cross-sectional view of the coupling of Fig. 1 with the coupling sections in connected position.

Referring now particularly to Fig. 4 of the drawings, the coupling illustrated includes first coupling member or valve body 1 of generally tubular construction and having a passage 6 extending therethrough and leading into the chamber 2 through ports 7. The end fitting 5 is formed with an enlarged head 8 which is adapted to threadedly receive the free end of a conduit 10 forming one section of the hydraulic line. It will be understood that the conduit 10 may be a rigid pipe or flexible hose having any suitable type of end for connecting it securely to the end fitting 8. The hydraulic line may be any line carrying a suitable hydraulic fluid, such as hydraulic oil, under pressure and may for example form a connection between a source of fluid under pressure and a device responsive to the force exerted by such fluid, as explained hereinbefore.

A second coupling member or plug body 15 is provided which is of generally tubular form and has a passage extending therethrough including an enlarged portion or chamber 16 and a reduced portion or bore 17 which latter is preferably of approximately the same diameter as the reduced portion 3 of the valve body 1. The plug body 15 is formed with threads 18 at its outer end and receives therein an end fitting 19 having a bore 20 therethrough leading into the chamber 16 and an enlarged head 21 adapted to receive the end of a conduit 23 forming the second section of the hydraulic line. The conduit 23 may be of any suitable form and may be similar to the conduit 10 if desired. Moreover, while the illustrative embodiment of the invention is described as used with a hydraulic system, it will be understood that the invention is well adapted for use in a line carrying a gas or gases under pressure, as for example compressed air, and the term fluid will be understood to refer to both liquid and gaseous materials. The valve body 1 and plug body 15 are adapted to be brought together in coupling position wherein they are in alignment with the openings 3 and 17 in communication connecting the conduits 10 and 23. The coupling members are held in coupling position by suitable means hereinafter more fully described in detail.

In order to close or seal the ends of the line sections 10 and 23 when the coupling is separated or uncoupled, thereby to prevent loss of hydraulic fluid from the two sections of the line, means are provided in association with each of the coupling members for instantly and automatically closing the passages therein to thereby close the free ends of the line sections upon separation of the coupling members 1 and 15. The closing means are so constructed that they are automatically opened when the coupling members 1 and 15 are moved into coupling position connecting the two sections of the line.

The means for closing the passage in the plug body includes a sliding valve 25 having a generally cylindrical body portion slidable in the bore 3 and extending into the chamber 2 where the valve has an enlarged head 27 adapted to seat, when in closed position against a valve seat 28 formed at the juncture of the chamber 2 and the bore 3. The valve seat 28 may be located a substantial distance short of the inner end (right hand end as viewed in Fig. 4) of the valve body. However, the valve 25 is of sufficient length so that it projects beyond the inner end of the valve body in all positions of the valve 25 and is adapted to enter the bore 17 when the coupling members are moved toward each other. The sliding valve 25 is formed as a self-closing valve and is normally urged toward closed position (to the right as viewed in Fig. 4) by a valve spring 30 acting between the inner end wall of the end fitting 5 and the end wall of the head 26. Threaded into the head 27 is a plug 31 which is adapted to abut against a projection 32 formed on the inner end of the end fitting 5 for determining the limit of retraction of the sliding valve 25. The head of the screw 31 and the projection 32 also serve to position the valve spring 30.

The sliding valve 25 is formed with a hollow interior 33 and rearward ports 34 leading into the interior 33 adjacent the rear. The ports 34 are so positioned that when the valve is in retracted or open position (Fig. 4) the valve chamber 33 is in communication with the chamber 2 but when the valve is in closed position communication is closed between the chamber 2 and the interior of the sliding valve 25. At its forward end the sliding valve 25 is provided with a plurality of forward ports 36 which, when the coupling members 1 and 15 are in coupled position lead into the bore 17, the end of the valve 25 being at that time positioned within the bore 17.

In order to provide a fluid tight seal between the valve body 1 and the plug body 15 when these members are in coupling position and to prevent leakage of fluid from the coupling, sealing rings 35 and 37 are provided in the valve body 1 and plug body 15, respectively, adjacent the free or inner ends of these members respectively. The sealing rings 35 and 37 preferably are formed of suitable resilient material and are disposed in annular grooves formed internally in the respective members and are of a diameter to snugly receive the sliding valve 25.

The plug body 15 also is provided with automatically acting valve means for closing the end of the corresponding section of the hydraulic line when the coupling is in separated condition. Such means includes a check valve 40 slidable in the chamber 16 and having a head 41 adapted to seat against a valve seat 42 formed at the juncture of chamber 16 and bore 17. The check valve 40 is self-closing and is normally urged into closed position by a spring 43 seated against a shoulder 44 formed in the outer end of the check valve 40 and a second shoulder 45 formed in the inner end of the end fitting 19.

The check valve 40 is formed with an interior chamber 46 which communicates through a plurality of ports 47 with the plug body chamber 16. Thus when the valve is in open position, communication is established from the interior of the conduit 23 through the check valve 40, the chamber 16 with the bore 17.

Figure 5:
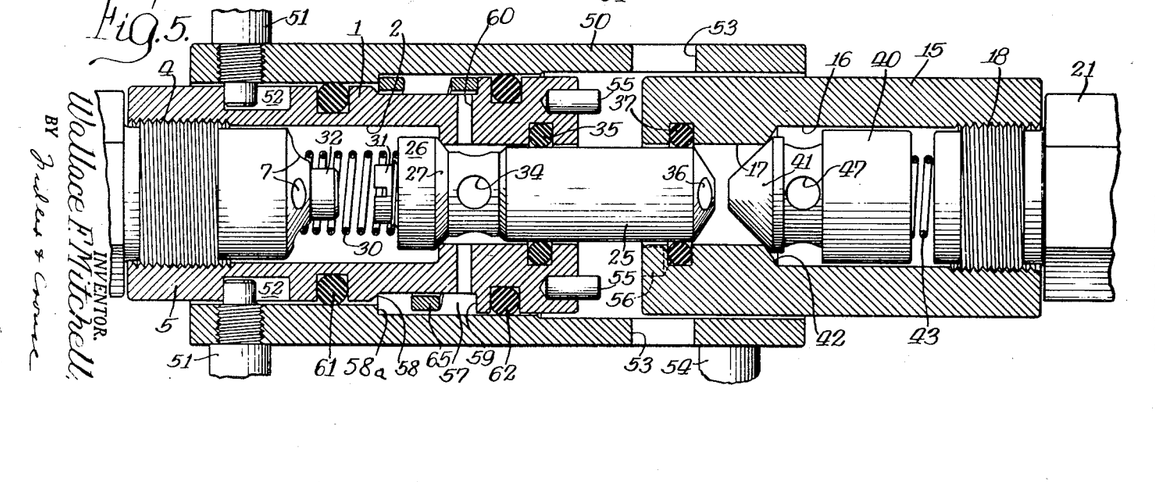
Fig. 5 is a view similar to Fig. 4 only showing the coupling sections in the position which they assume during the coupling operation and just prior to effecting the coupling between the line sections.

The sliding valve 25 and the check valve 40 are normally retained in closed positions respectively when the coupling members 1 and 15 are separated thus closing or sealing the ends of the two line sections 10 and 23. The sliding valve 25 and the check valve 40 are so dimensioned and positioned within the respective coupling members that when the coupling members 1 and 15 are brought into registry and moved toward coupling position the end of the sliding valve 25 which projects from the coupling member 1 enters the bore 17 (Fig. 5) and, as the coupling members are moved further toward coupling position, the ends of the sliding valve 25 and check valve 40 abut and mutually force each other away from their respective seats and into open position against the force of their respective springs, thereby placing both sides of the hydraulic line in communication. The valve seat 28 is located a sufficient distance short of the inner end (left hand end as viewed in Fig. 4) of the plug body 15 so that the inner end of the sliding valve 25 reaches a sealing position within the plug body 15 before the valves are unseated. When the coupling is disconnected and the coupling members are separated, the valves immediately are moved to closed position by their springs to close the respective sections of the hydraulic line before the end of the sliding valve is withdrawn from the plug body.

Means are provided for holding the coupling members 1 and 15 in alignment and against axial separation which means is released when excessive tension is applied on the line. To this end the holding means includes a sleeve 50 which receives the end of and carries the valve body 1 for limited sliding movement therein. The sleeve 50 is prevented from detachment from the valve body 1 by a plurality of large pins or studs 51, preferably two in number and arranged in diametrically opposed relation, which studs are threaded into the sleeve and project into grooves 52 formed in the periphery of the valve body 1. The grooves are elongate in a direction parallel to the axis of the valve body and permit limited movement in that direction between the valve body and the sleeve. Preferably the studs 51 are of substantial length whereby they serve as handles to permit convenient manual connection of the coupling sections. However, in certain cases it may be found preferable to employ short studs (not shown) which do not extend substantially beyond or which are flush with the periphery of the sleeve 50.

Figures 6, 7:
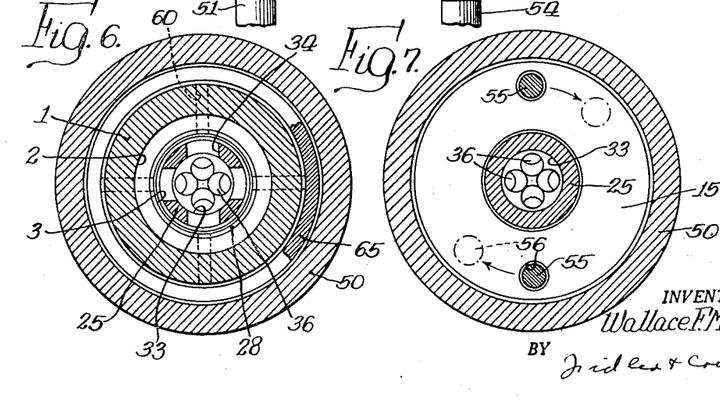
Fig. 6 is a view of a cross section taken along line 6—6 of Fig. 4.
Fig. 7 is a view of a cross section taken along line 7—7 of Fig. 4.

The sleeve 50 is adapted to receive the inner or free end of the plug body 15 snugly for maintaining it in alignment and coupling relation with the valve body, and has a plurality of (preferably two) open end slots 53 formed therein which are adapted to receive correspondingly disposed studs 54 threaded into the plug body 15. Each slot 53 has an open end portion 53a extending substantially axially of the sleeve, an intermediate portion 53b which is curved and has a pitch which varies progressively from a relatively steep pitch to a relatively flat pitch and an inner end portion 53c extending at a wide angle to the axis of the sleeve. The edge of the inner end portion 53c provides an abutment against which the corresponding stud 54 is adapted to bear when the plug body 15 is disposed on the sleeve in coupling position. The shape of the inner slot end 53c of the slot 53 is such that it provides an abutment which resists direct axial movement of the plug body in a direction out of the sleeve but only when the plug body is prevented from rotating in the sleeve. That is, the slot 53 is so shaped that upon application of an axial force on the plug body tending to move it out of the sleeve 1 the edge of the slot acts as a cam and causes the plug body 15 to rotate in a clockwise direction (as viewed in Fig. 7) unless the latter is held against such rotation.

For preventing rotation of the plug body 15 in the sleeve 50 and thereby locking the plug body 15 in the sleeve 50, a plurality of small studs or pins 55 project from the inner end of the valve body 1 preferably parallel to the axis thereof and are adapted to enter sockets or recesses 56 formed in the opposing end of the plug body 15 when the plug body and valve body are in end-to-end abutment (as shown in Fig. 4). Thus, when the pins 55 are seated in the sockets 56 the plug body 15 cannot rotate and is therefore held against axial displacement even when a substantial force is applied axially on the line sections tending to withdraw the plug body from the sleeve. However, owing to the stud and slot connection between the valve body 1 and the sleeve 50, the valve body may be retracted from its advanced position abutting the plug body, that is, moved (to the left as viewed in Fig. 4) to disengage the pins 55 from their sockets 56 and permit the plug body 15 to rotate and be withdrawn from the sleeve 50.

The valve body 1 is normally maintained resiliently in its inner or advanced position in the sleeve (to the right as viewed in Fig. 4) so that when the plug body is in coupling position in the sleeve the pins 55 are held in the sockets 56 and lock the plug body against rotation in the sleeve.

To this end an annular chamber 57 is provided which is defined between a reduced peripheral portion of the valve body 1 and an enlarged portion of the bore of the sleeve 50. Shoulders 58 and 58a are provided on the valve body and sleeve respectively at one end of the chamber and a shoulder 59 at the other end of the chamber which constitute the end walls of the annular chamber. The annular chamber 57 is connected through a passage or port 60 with the bore 3 and thereby is placed in communication with the chamber 2 when the valve 25 is open but which passage is closed when the valve 25 is closed,. Accordingly, when the valve is open, fluid under line pressure enters the annular chamber 57 and tends to expand the chamber thereby urging the valve body 1 inwardly toward its advanced position in the sleeve. There is thus provided hydraulic locking means effective when the coupling is in coupled condition for holding the valve body 1 against the plug body with the pins 55 in locking position in their sockets wherein they prevent rotation of the plug body 15 in the sleeve.

The annular chamber 57 is sealed against leakage of fluid therefrom by sealing rings 61 and 62 carried in annular grooves formed externally in the valve body 1 adjacent the shoulders 57 and 59 respectively. The sealing rings 61 and 62 which are formed of suitable material project slightly beyond the periphery of the adjacent portions of the valve body 1 and bear against the corresponding inner wall of the sleeve to provide fluid tight seals therewith.

Additional resilient means for maintaining the valve body 1 in advanced position also is provided which means takes the form of a coil spring 65 disposed in the annular chamber 57 and having one end bearing against the shoulder 58 and the other end against the shoulder 59. The spring 65 is placed under a predetermined initial compression and thus acts in the same direction as the fluid pressure in the chamber 57 and provides additional force to urge the valve body toward its advanced position. The spring 65 being active at all times serves to maintain the valve body in its advanced position at all times, even when there is no fluid pressure in the annular chamber 57. Thus the spring serves to maintain the valve body yieldably in its inner position in the event that the fluid line pressure should drop to a low value or even zero.

When the coupling is in connected condition the pressure of the fluid in the interior of the plug body and the valve body exerts a force on these members tending to separate them which tends to urge the valve body toward its retracted position in the sleeve (to the left as viewed in Fig. 4). This force is opposed by the force exerted on the valve body by the spring 65 and by the fluid in the annular chamber. Preferably the coupling is so dimensioned that the force exerted by the fluid in the annular chamber is equal to and balances the force tending to retract the valve body and thus the valve body is held resiliently in its advanced position in the sleeve by an overbalancing force equal to that exerted by the spring.

When the coupling members are in disconnected condition, the slide valve 25 and the check valve 40 are held closed by their respective springs 30 and 43 and thus both sections of the hydraulic line are closed. If there is any fluid pressure in either or both sections of the line the corresponding valve is also maintained against its seat by such fluid pressure. The valve body 1 is maintained in its advanced or inner position in the sleeve solely by the spring 65.

Figures 1, 2, 3:
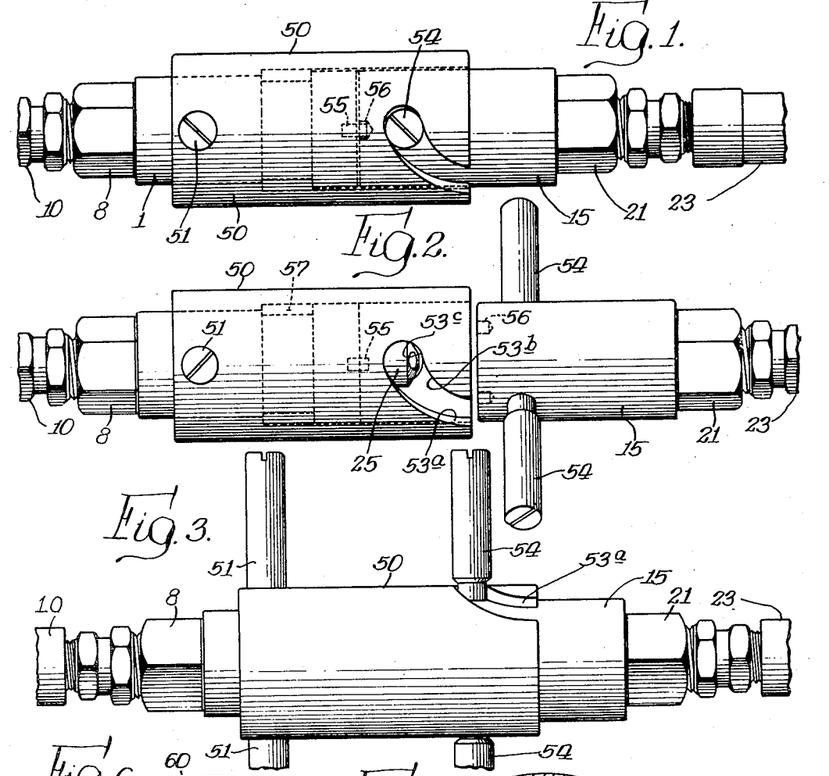
Figure 1 is a top plan view of one form of coupling constructed in accordance with my invention, with the two sections of the coupling being shown in connected position.
Fig. 2 is a view similar to Fig. 1 only showing the sections of the coupling in separated condition but in position to be connected.
Fig. 3 is a side elevational view of the coupling in coupled condition.

The coupling is connected to couple the two sides of the hydraulic line by bringing the plug body 15 into alignment with the sleeve 50 and with the studs 54 disposed in alignment with the open ends with the slots 53, as illustrated particularly in Fig. 2 of the drawings. The plug body 15 is then inserted in the sleeve 50 and manually rotated whereby the slots 53 exert a camming action on the studs 54 to advance the plug body 15 in the sleeve 50. As the plug body 15 is advanced toward the valve body 1 the projecting end of the sliding valve 25 enters the bore 17 and thus places the interior of the sliding valve 25 in communication with the interior of the plug body 15 prior to opening of the valves 25 and 40. Accordingly, when the valves are opened no fluid can leak from the coupling. Upon further movement of the plug body 15 toward the valve body 1 the inner end faces of the valves 25 and 40 abut and mutually unseat each other thereby establishing communication between the interiors of the two line sections.

During the initial movement of the plug body 15 into the sleeve 50 and before the valves 25 and 40 are opened, the studs 54 move along the relatively steep portions 53a of the slots 53 and thus the plug body may be advanced rapidly into the sleeve with but a slight rotation. However, when the plug body 15 has been advanced to a position wherein the valves are unseated, the studs 54 are then in the intermediate portions 53b of the slots having a flatter pitch and accordingly the cam formed by the slots and studs provides a mechanical advantage which aids the operator in overcoming the resistance to further movement of the plug body into the sleeve which is offered by the pressure of the fluid in the line tending to urge the plug body away from the valve body.

As the plug body 15 is moved into the sleeve 50 its inner end wall abuts the pins 55 and moves the valve body 1 outwardly in the sleeve (to the left as viewed in Fig. 4) against the force of the spring 65 to permit the plug body to complete its movement into the sleeve. As soon as the slide valve 25 is opened, the fluid in the annular chamber 57 is placed under line pressure and urges the valve body inwardly in the sleeve with a force which is equal to and balances the force exerted by the fluid on the valves tending to separate the valve body and plug body. Thus, the valve body is moved toward its advanced position by an overbalancing force equal to the force of the spring 65. Accordingly, the only force necessary to advance the plug body to its final position in the sleeve is that necessary to overcome the force of the spring 65.

During the final portion of the movement of the plug body 15 into the sleeve, the former is rotated into a position wherein the pins 55 are in alignment with the sockets 56, whereupon the valve body 1 is forced forwardly by the spring 65 and the pins 55 enter the sockets 56. The pins 55, when in the sockets 56, lock the plug body 15 against rotation in the sleeve and thus the plug body 15 is held against axial separation from the valve body 1. The coupling thus is fully locked in coupling position.

If, when the coupling is in connected or coupled condition, tension is applied on the fluid line in an axial direction in excess of the force of the spring 65, such spring is compressed permitting the valve body and the sleeve to move relatively to each other in an axial direction, thus disengaging the pins 55 and the slots 56 and unlocking the plug body 15 so that it is no longer locked against rotation in the sleeve 50. Owing to the fact that the inner end portions 53c of the slots 53 are inclined to the axis of the sleeve and are not fully perpendicular thereto the axial separating force applied to the plug body 15 causes the slot edges to exert a camming action on the studs 54 and rotate the plug body 15 in the sleeve so that the slots are no longer effective to prevent axial movement of the plug body 15 in the sleeve. The plug body therefore is withdrawn from the sleeve and the coupling disconnected. The steeper pitch of the middle and outer end portions of the slots permits the plug body to be withdrawn rapidly from the sleeve and with a very slight force after the plug body has been rotated sufficiently to withdraw the studs from the inner end portions of the slots. Thus a rapid uncoupling action takes place.

As soon as the plug body 15 has been separated from the valve body, and before the valve 25 is withdrawn from the plug body 15, the plug body and valve body are separated sufficiently to permit the valves 25 and 40 to be closed by their respective springs and thus seal the free ends of the two sections of the hydraulic line and preventing leakage therefrom. It will be seen, therefore, that the only fluid which can leak from the system is that which is contained in the valve chamber 33 and that portion of the bore 17 inwardly of the valve seat 42. Since the volume of these portions of the coupling is very small only a very slight amount of oil is lost when the coupling is disconnected.

Various modifications may be made in the construction of the coupling without departing from the inventive concept herein disclosed and by way of illustration of one such modification a second embodiment of the invention is shown in Figs. 8–11 inclusive. It will be understood that where the device illustrated therein is not described in detail the construction and operation are generally similar to the construction and operation of the embodiment illustrated in Figs. 1 to 7 inclusive and described hereinbefore.

Figure 8:
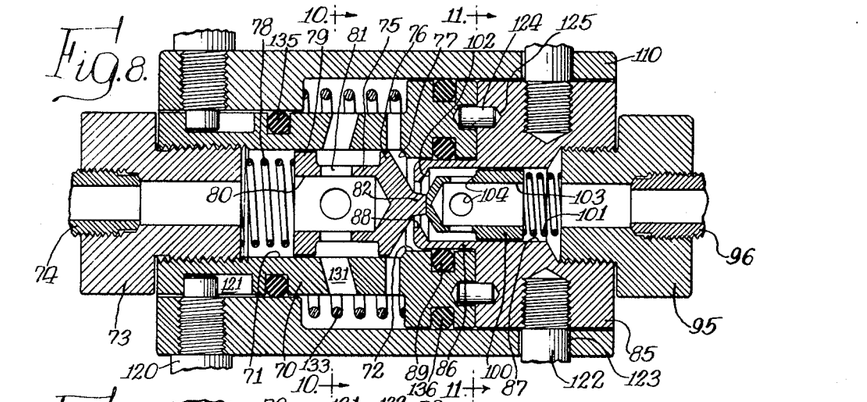
Fig. 8 is a longitudinal, sectional view through a second form of coupling embodying the present invention with the sections being shown in connected position.

Referring now particularly to Fig. 8 of the drawings, the second embodiment of the coupling includes a valve body 70 having a bore 71 terminating in an inner end portion 72 of reduced diameter. The valve body threadedly receives an end fitting 73 to which one section 74 of the hydraulic line is adapted to be connected.

A sliding valve 75 is slidable in the bore 71 and has a head 76 adapted to seat against a seat 77 at the juncture of the main portion 71 of the bore and of the reduced end portion 72. The sliding valve 75 is normally urged toward its seat by a spring 78 acting between the inner end of the fitting 73 and a base flange 79 on the sliding valve 75. The seat 77 is located at a substantial distance short of the inner end of the valve body so that the inner end (right end as viewed in Fig. 8) of the sliding valve remains entirely within the valve body in all positions of the valve. The sliding valve is formed with a bore 80 communicating directly with the bore 71 rearwardly of the base flange 79 and communicating through ports 81 with the bore 71 forwardly of the base flange.

A plug body 85 is provided which has a forwardly extending valve housing portion 86 shaped to enter the inner end of the bore 72 when the plug body 85 is brought into coupling position with the valve body 70. The plug body has a bore 87 extending therethrough and terminating in an outlet port 88 at the inner end of the valve housing portion 86. An end fitting 95 is threadedly received in the outer end of the plug body 85 and is adapted to receive the end 96 of the second section of the hydraulic line.

Figure 9:
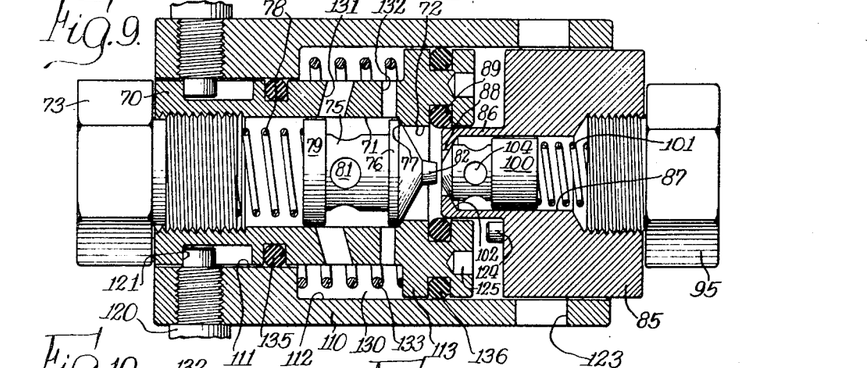
Fig. 9 is a view similar to Fig. 8 only showing the coupling sections in the position which they assume during the coupling operation and just prior to coupling of the line sections.
Figures 10, 11:
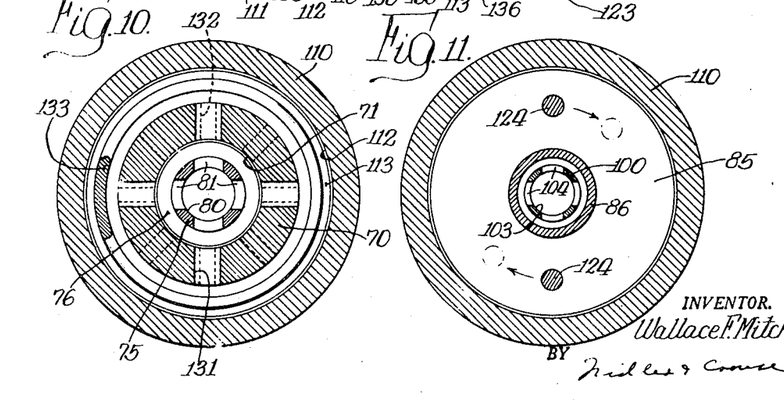
Fig. 10 is a view of a cross section taken along line 10—10 of Fig. 8.
Fig. 11 is a view of a cross section taken along line 11—11 of Fig. 8.

A check valve 100 is slidable in the bore 87 and is normally urged inwardly by a spring 101 toward an annular seat 102 inwardly surrounding the outlet port 88. The check valve 100 is so formed that when seated (as shown in Fig. 9) it does not extend beyond the outer surface of the valve housing portion 86. The sliding valve 75 is formed with a nose or projection 82 adapted to abut the forward end of the check valve 100 when the coupling is connected (as shown in Fig. 8) and thereby unseat the check valve 100 and the sliding valve 75.

The check valve 100 is formed with a bore 103 and outlet ports 104 which together provide communication through the check valve 101 when it is in open position to permit the passage of fluid through the plug body 85.

The plug body 85 and the valve body 70 are adapted to be held in connected relation by a sleeve 110 having a bore formed with a portion 111 adapted to slidably receive the main portion of the valve body 70 and an enlarged bore portion 112 adapted to receive an enlarged head portion 113 formed at the inner end of the valve body 70.

The valve body 70 is held in the sleeve 110 by studs 120 threaded into and extending through the sleeve at diametrically opposed portions thereof. The inner ends of the studs 120 enter grooves 121 and thus prevent separation of the valve body 70 and the sleeve 110 by permitting the former to slide through a distance within the sleeve.

The plug body 85 is adapted to be introduced into and secured in the sleeve 110 in a manner similar to that described in connection with the first embodiment of the invention. For this purpose studs 122 are threaded into the plug body 85 at diametrically opposite portions thereof and are adapted to enter curved slots 123 generally similar in form to the slots 53 in the sleeve 50 illustrated in Fig. 1 of the drawings.

An annular chamber 130 is defined between the sleeve 110 and the valve body 70 and communicates through a port 131 with the bore 71 at the portion thereof which is in communication with the ports 81 of the sliding valve 75 and thus the annular chamber 130 is in communication with the interior of the sliding valve 75 in all positions of the latter. A second port 132 provides communication between the annular chamber 130 and the bore 71 at a point adjacent the valve seat 77 whereby when the valve body 75 is seated the annular chamber communicates only with the bore 71 between the valve head 76. However, the port 132 is so positioned that when the sliding valve 75 is in open position communication is established between the annular chamber 130 and the bore 71 forwardly of the valve head 76; accordingly, in this position of the sliding valve communication is established from the left hand line section (as viewed in Fig. 8) through the sliding valve 75. The port 131, the annular chamber 130, the port 132, the bore 71 forwardly of the sliding valve and the bore portion 72. The check valve 100 being in open position, communication is further established between the bore portion 72 through the port 88, the bore 87 and the check valve 100 whereby both sides of the line are in full communication.

The annular chamber 130 is sealed to prevent leakage of fluid therefrom by means of sealing rings 135 and 136 carried on the main body portion of the valve body 70 and snugly fitting in the reduced bore portion 111 and sealing ring 136 carried in the enlarged head portion of the valve body and snugly fitting the enlarged bore portion 112 of the sleeve.

A spring 133 under predetermined initial compression is disposed in the annular chamber 130 and bears at one end against the shoulder provided at the junction of the bore portions 111 and 112 and at the other end against the enlarged end 113 of the valve body thereby urging the valve body toward its inner position within the sleeve. The spring 133 acts in the same direction as the fluid pressure in the annular chamber 130 and aids in maintaining the valve body 70 resiliently in its innermost position. Preferably the coupling is so designed that the fluid pressure in the annular chamber balances the force tending to retract the valve body and thus the spring 133 provides an overbalancing force which holds the coupling in coupling condition.

The operation of the embodiment of the invention illustrated in Figs. 8–11 is generally similar to the operation of the embodiment of the invention illustrated in Figs. 1–7. However, it will be noted that owing to the arrangement of the ports 131 and 132 the fluid in the annular chamber 130 is at all times under the same pressure as the fluid in the corresponding section of the hydraulic line. It will also be noted that while the valves in this embodiment of the invention also operate to mutually unseat each other in a manner similar to the first described form, yet in this latter form the valves are located entirely within their respective coupling members. In many cases this is desirable inasmuch as the valves are thus protected against damage which otherwise result from adherence of dirt to the valves were they exposed or from the valves striking against other objects. This embodiment of the invention also provides a coupling which may be made relatively short and compact.

From the foregoing it will be seen that the present invention provides a fluid coupling for connecting two sections of a fluid conduit which securely maintains them in coupled relation but which is capable of separating automatically upon the application of a predetermined tension on the line thus preventing damage to the coupling or apparatus connected to the fluid line. The coupling provides complete sealing against leakage of the fluid when in connected condition and immediate closure or sealing of the ends of the two sections of the line when the coupling is separated, thus preventing any substantial loss of fluid upon separation of the coupling.

The coupling is so constructed that the coupling members may be easily coupled manually without the application of a large force, even when the two sections of the line contain fluid at relatively high pressure. The coupling may be connected by simply inserting the plug body in the sleeve and relatively rotating these members, the cam action provided by the inclined slots being effective to permit movement of the coupling members together upon the application of a relatively small force.

The coupling is self-locking when moved into coupled position and does not require the manipulation of any additional locking device. Moreover, upon separation of the coupling, such as caused by excessive tension on the line there are no moving parts, other than the coupling members themselves, which are actuated and which might damage the apparatus or endanger the operator in the event that he should be near the coupling at the time of separation.

The coupling is relatively simple and rugged in construction and lends itself readily to manufacture in various forms and sizes whereby the coupling may be adapted for use in many different types of apparatus.

The provision of the expansible chamber into which fluid is admitted under line pressure to balance the force exerted by the pressure of the fluid tending to open the coupling provides several advantages. The spring which holds the coupling locked may be made relatively light and thus the resistance offered to completion of the coupling movement is not excessive. Moreover, the force which locks the coupling in connected condition may be varied, if desired, by changing the spring. On the other hand the use of a spring for maintaining the coupling connected insures that it will remain connected even if the line pressure should fall to a very low value or even to zero. Moreover, since the fluid pressures are balanced, regardless of the pressure in the line, the force with which the coupling is held connected may be accurately predetermined solely by appropriate selection of the spring and thus is independent of any variations in fluid pressures.

I claim:

1. A separable fluid coupling comprising first and second separable coupling members each having a fluid passage therethrough, holding means effective when said coupling members are in coupling position and locked against relative rotation for retaining said coupling members in coupling position wherein they are in axial alignment with their passages in mutual communication, said holding means being releasable only upon relative rotation of said coupling members, locking means effective when said coupling members are held against axial separation for locking said coupling members against relative rotation and releasable only upon predetermined axial separation of said coupling members without rotation thereof, and means effective at least when said coupling members are in coupling position for resiliently opposing axial separation of said coupling members.

2. A self-sealing, separable fluid coupling comprising first and second separable coupling members each having a fluid passage therethrough, a self-closing valve in each of said coupling members for closing said passages respectively and held in open position only when said coupling members are in coupling position, holding means effective when said coupling members are in coupling position and locked against relative rotation for retaining said coupling members in coupling position wherein they are in axial alignment with their passages in mutual communication, said holding means being releasable only upon relative rotation of said coupling members, locking means effective when said coupling members are held against axial separation for locking said coupling members against relative rotation and releasable only upon predetermined axial separation of said coupling members without rotation thereof, and means effective at least when said coupling members are in coupling position for resiliently opposing axial separation of said coupling members.

3. A separable fluid coupling comprising first and second coupling members each having a fluid passage therethrough, a sleeve carrying said first coupling member and adapted to receive said second coupling member therein for maintaining said coupling members in alignment with their passages in mutual communication, holding means on said second coupling member and said sleeve engageable when said second coupling member is in coupling position in said sleeve for releasably holding said second coupling member against axial movement out of said sleeve and disengageable only upon relative rotation between said second coupling member and said sleeve, locking means on said coupling members engageable when said coupling members are in coupling position and held against axial separation for releasably locking said coupling members against relative rotation and disengageable only upon predetermined axial separation of said coupling members without rotation thereof, and means effective at least when said coupling members are in coupling position for resiliently opposing axial separation of said coupling members.

4. A self-sealing, separable fluid coupling comprising first and second separable coupling members each having a fluid passage therethrough and a self-closing valve for closing said passage when said coupling members are separated and positioned to abut and open the other valve when said coupling members are in coupling position, a sleeve carrying said first coupling member for limited sliding movement therein and adapted to receive said second coupling member for maintaining said coupling members in alignment with their passages in mutual communication, means on said second coupling member and said sleeve engageable when said second coupling member is in coupling position in said sleeve for releasably holding said second coupling member against axial movement out of said sleeve and separable only upon relative rotation between said second coupling member and said sleeve, locking means on said coupling members engageable when said coupling members are in coupling position in said sleeve and held against axial separation, and means for yieldingly opposing axial separation of said coupling members including an expansible fluid chamber defined by said sleeve and said first coupling member and a port connecting said chamber and the passage in said first coupling member for admitting fluid to said chamber to maintain said chamber expanded under the pressure of the fluid in said passage.

5. A separable fluid coupling comprising first and second coupling members each having a fluid passage therethrough, a sleeve carrying said first coupling member for limited axial sliding movement therein and adapted to receive said second coupling member therein for maintaining said coupling members in axial alignment with their passages in mutual communication, said sleeve having an arcuate open end slot therein, a stud on said second coupling member adapted to enter said slot when said second coupling member is inserted in said sleeve and to retain said second coupling member against axial withdrawal from said sleeve except upon relative rotation thereof, means on said coupling members engageable when said second coupling member is in coupling position in said sleeve and said first coupling member is slidably advanced in said sleeve toward said second coupling member for locking said second coupling member against rotation in said sleeve, and means effective at least when said coupling members are in coupling position for resiliently maintaining said first coupling member in advanced position in said sleeve.

6. A separable fluid coupling comprising first and second coupling members each having fluid passages therethrough mutually communicating when said coupling members are in coupled relation, a sleeve carrying said first coupling member for limited axial sliding movement therein and adapted to receive the end of said second coupling member, said sleeve having an inclined slot formed therein with an open end portion extending substantially parallel to the axis of said sleeve and a closed end portion extending at a wide angle to said axis, a stud carried on said second coupling member in position to enter said slot when the end of said second coupling member is inserted in said sleeve and to bear against the inner portion of said slot when said second coupling member is in coupling position to releasably retain said second coupling member against axial withdrawal from said sleeve except upon relative rotation thereof, a socket in the inner end of one of said coupling members, a pin projecting from the inner end of the other coupling member parallel to the axis thereof in position to enter said socket when said second coupling member is fully inserted in said sleeve, and means effective at least when said second coupling member is in coupling position for resiliently urging said first coupling member inwardly in said sleeve to releasably retain said pin in said socket and prevent separation of said second coupling member and said sleeve.

7. A self-sealing, separable fluid coupling comprising first and second coupling members each having a passage therethrough and a spring-seated valve therein for closing said passage, said valves being positioned to mutually engage when said coupling members are in coupling position and hold each other in open position wherein said passages are in communication, a sleeve carrying said first coupling member for limited sliding movement therein between advanced and retracted positions and adapted to receive said second coupling member therein, holding means including a holding element on said second coupling member positioned to engage said sleeve when said second coupling member is in coupling position in said sleeve for holding said second coupling member against axial movement out of said sleeve and disengageable upon relative rotation between said second coupling member and said sleeve, locking means including locking elements on said coupling members respectively and mutually engageable when said second coupling member is in coupling position in said sleeve and said first coupling member is in its advanced position in said sleeve for locking said second coupling member against rotation in said sleeve and released when said first coupling member is in its retracted position in said sleeve, and means effective, at least when said second coupling member is in coupling position in said sleeve, for yieldingly urging said first coupling member toward its advanced position in said sleeve.

8. A self-sealing, separable fluid coupling comprising first and second coupling members each having a passage therethrough and a spring-seated valve therein for closing said passage, said valves being positioned to mutually engage when said coupling members are in coupling position and hold each other in open position wherein said passages are in communication, a sleeve carrying said first coupling member for limited sliding movement therein between advanced and retracted positions and adapted to receive said second coupling member therein, holding means including a holding element on said second coupling member positioned to engage said sleeve when said second coupling member is in coupling position in said sleeve for holding said second coupling member only against axial movement out of said sleeve and disengageable upon relative rotation between said second coupling member and said sleeve, locking means including locking elements on said coupling members respectively and mutually engageable when said second coupling member is in coupling position in said sleeve and said first coupling member is in its advanced position in said sleeve for locking said second coupling member against rotation in said sleeve and released when said first coupling member is in its retracted position in said sleeve, and spring means acting between said first coupling member and said sleeve for resiliently urging said first coupling member toward its advanced position in said sleeve.

9. A self-sealing, separable fluid coupling comprising first and second coupling members each having a passage therethrough and a spring-seated valve therein for closing said passage, said valves being positioned to mutually engage when said coupling members are in coupling position and hold each other in open position wherein said passages are in communication, a sleeve carrying said first coupling member for limited sliding movement therein between advanced and retracted positions and adapted to receive said second coupling member therein, holding means including a holding element on said second coupling member positioned to engage said sleeve when said second coupling member is in coupling position in said sleeve for holding said second coupling member against axial movement out of said sleeve and disengageable upon relative rotation between said second coupling member and said sleeve, locking means including locking elements on said coupling members respectively and mutually engageable when said second coupling member is in coupling position in said sleeve and said first coupling member is in its advanced position in said sleeve for locking said second coupling member against rotation in said sleeve and released when said first coupling member is in its retracted position in said sleeve, and means including an expansible fluid chamber between said first coupling member and said sleeve and connected to the passage in said first coupling member, at least when said second coupling member is in coupling position in said sleeve for yieldingly urging said first coupling member toward its advanced position in said sleeve.

10. A self-sealing, separable fluid coupling comprising first and second coupling members each having a passage therethrough and a spring-seated valve therein for closing said passage, said valves being positioned to mutually engage when said coupling members are in coupling position and hold each other in open position wherein said passages are in communication, a sleeve carrying said first coupling member for limited sliding movement therein between advanced and retracted positions and adapted to receive said second coupling member therein, holding means including a holding element on said second coupling member positioned to engage said sleeve when said second coupling member is in coupling position in said sleeve for holding said second coupling member against axial movement out of said sleeve and disengageable upon relative rotation between said second coupling member and said sleeve, locking means including locking elements on said coupling members respectively and mutually engageable when said second coupling member is in coupling position in said sleeve and said first coupling member is in its advanced position in said sleeve for locking said second coupling member against rotation in said sleeve and released when said first coupling member is in its retracted position in said sleeve, and means for yieldingly urging said first coupling member toward its advanced position in said sleeve, said means including a spring acting between said first coupling member and said sleeve and an expansible chamber between said first coupling member and said sleeve and connected to the passage in said first coupling member at least when said second coupling member is in coupling position in said sleeve.

11. A self-sealing, separable fluid coupling comprising first and second coupling members each having a fluid passage extending therethrough, a valve seat in said passage and a self-seating valve disposed entirely within said coupling member and cooperating with said seat therein for closing said passage, the valve in said first coupling member having a body portion projecting outwardly beyond the valve seat and the valve seat being disposed sufficiently inwardly of the end of the passage whereby the outer end of said body portion terminates within said passage, said second coupling member having its end portion shaped to enter the end of the passage in said first coupling member to cause the valve therein to abut the projecting end of said body portion when said coupling members are in coupling position to mutually unseat said valves and open communication through said passages, a sleeve carrying one of said coupling members and adapted to receive the other of said coupling members for holding said coupling members in axial alignment, and means including a spring within said sleeve and opposing relative movement of said sleeve and the coupling member supported by it effective when said other coupling member is in coupling position in said sleeve for holding said coupling members in coupled condition, said means further including locking elements carried by said coupling members releasable only upon the application of a predetermined axial separating force on said coupling members.

12. A self-sealing, separable fluid coupling comprising first and second coupling members each having a fluid passage extending therethrough, a valve seat in said passage inwardly of the end thereof, and a self-closing valve cooperating with said seat for closing said passage inwardly of said valve seat, said valves being positioned to mutually abut and unseat each other when said coupling members are in coupling position, one of said valves having a body portion projecting out of the forward end of the corresponding coupling member for entering the passage in the other coupling member outwardly of the valve seat and having a passage opening at the outer end of said extension and communicating with the passage rearwardly beyond the valve seat in said corresponding coupling member only when said valve is open, a sleeve carrying one of said coupling members and adapted to receive the other of said coupling members for holding said coupling members in axial alignment, and means, including a spring in and concealed by said sleeve opposing relative movement of said sleeve and the coupling member supported by it in an uncoupling direction, and locking elements on said coupling members engageable when said coupling members are in coupled condition, said means being effective when said other coupling member is in coupling position in said sleeve to lock said coupling members in coupled condition and being releasable only upon the application of a predetermined axial separating force on said coupling members.

13. A self-sealing, separable fluid coupling comprising first and second coupling members each having a fluid passage therethrough, a connecting member carrying said first coupling member and receiving said second coupling member for retaining said coupling members in alignment, holding means between said connecting member and said second coupling member effective when said second coupling member is in coupling position in said connecting member for retaining said coupling members against separation, and locking means between said coupling members and engageable when said coupling members are in coupled position, and spring means within and concealed by said connecting member yieldingly maintaining said locking means locked and yieldable upon the application of a predetermined separating force on said coupling members for releasing said holding means and effecting separation of said coupling members.

14. A separable fluid coupling comprising a pair of separable coupling members each having a fluid passage therethrough, a sleeve slidable on one of said coupling members between retracted and projected positions and adapted to receive the other coupling member for retaining said members in alignment, holding means including holding elements on said sleeve and said other coupling member respectively and engaged when said other coupling member is in coupling position in said sleeve for retaining said coupling members against separation, locking means including locking elements on said coupling members respectively and engaged when said other coupling member is in coupling position in said sleeve and said sleeve is in retracted position, and means including a fluid chamber between said sleeve and said one coupling member and communicating with the passage in said first coupling member for yieldably retaining said sleeve in retracted position and yieldable upon the application of a predetermined separating force on said coupling members for releasing said locking means.

15. A separable fluid coupling comprising a pair of separable coupling sections each adapted to have a fluid conduit connected thereto, one of said coupling sections including a first coupling member having a fluid passage therethrough and a self-closing valve for closing said passage when said coupling sections are separated, the other of said coupling sections including a second coupling member having a fluid passage therethrough, a sleeve carried by said second coupling member for limited axial sliding movement relatively thereto between retracted and projected positions and adapted to telescopingly receive said first coupling member, and a self-closing valve for closing said passage when said coupling sections are separated, means including mutually engageable holding elements carried by said sleeve and said first coupling member respectively and effective when said first coupling member is in coupling position in said sleeve and said sleeve is in retracted position for holding said sleeve and said first coupling member against axial separation, and means including a fluid chamber between said sleeve and said second coupling member and communicating with the fluid passage of said second coupling member in the coupled condition of said coupling sections for releasably retaining said sleeve in retracted position.

16. A separable fluid coupling comprising a pair of separable coupling sections each adapted to have a fluid conduit connected thereto, one of said coupling sections including a first coupling member having a fluid passage therethrough, the other of said coupling sections including a second coupling member having a fluid passage therethrough and a sleeve carried by said second coupling members for limited axial sliding movement relatively thereto between retracted and projected positions and adapted to telescopingly receive said first coupling member, means including mutually engageable holding elements carried by said sleeve and said first coupling member respectively and effective when said first coupling member is in coupling position in said sleeve and said sleeve is in retracted position for holding said sleeve and said first coupling member against axial separation, means including a fluid chamber between said sleeve and said second coupling member and communicating with the fluid passage of said second coupling member in the coupled condition of said coupling sections for releasably retaining said sleeve in retracted position, and means for closing said fluid passages and the communication between said chamber and the fluid passage in said second coupling member when said coupling members are separated.

17. A separable fluid coupling comprising a pair of separable coupling sections each adapted to have a fluid conduit connected thereto, one of said coupling sections including a first coupling member having a fluid passage therethrough and a self-closing valve for closing said passage when said coupling sections are separated, the other of said coupling sections including a second coupling member having a fluid passage therethrough, a sleeve telescopingly carried by said second coupling member for limited axial sliding movement relatively thereto between retracted and projected positions and adapted to telescopingly receive said first coupling member, and a self-closing valve for closing said passage when said coupling sections are separated, means including mutually engageable holding elements carried by said sleeve and said first coupling member respectively and effective when said first coupling member is in coupling position in said sleeve and said sleeve is in retracted position for holding said sleeve and said first coupling member against axial separation, and means including a spring enclosed between said sleeve and said second coupling member for releasably retaining said sleeve in retracted position.

18. A separable fluid coupling comprising a pair of separable coupling sections, one of said coupling sections including a first coupling member having a fluid passage therethrough and a self-closing valve for closing said passage when said coupling sections are separated, the other of said coupling sections including a second coupling member having a fluid passage therethrough, a sleeve carried by said second coupling members for limited axial sliding movement relatively thereto between retracted and projected positions and adapted to telescopingly receive said first coupling member, and a self-closing valve for closing said passage when said coupling sections are separated, means including mutually engageable holding elements carried by said sleeve and said first coupling member respectively, effective when said first coupling member is in coupling position and said sleeve is in retracted position for holding said sleeve and said first coupling member against axial separation and releasable upon axial relative separating movement of said coupling members, means including a fluid chamber between said sleeve and said second coupling member and communicating with the passage of said second coupling member in the coupled condition of said coupling sections and a spring in said chamber for releasably retaining said sleeve in retracted position, and conduit sections rigidly connected to said coupling members respectively whereby a predetermined tension on said conduit sections effects relative axial separating movement of said coupling sections.

19. A separable fluid coupling comprising a pair of coupling members each having a fluid passage therethrough and a self-closing valve for closing said passage when said coupling members are separated, a sleeve telescopingly carried by one of said coupling members for axial sliding movement thereon between retracted and projected positions and projecting therebeyond for telescopingly receiving the other coupling member, stud and slot means for holding said sleeve and first coupling member against relative rotation and for limiting relative axial movement therebetween, radially extending projections on said second coupling member, open end camways on said sleeve positioned to receive said projections when said second coupling member is inserted in said sleeve and shaped to engage said projections to hold said sleeve and second coupling member against axial separation when said second coupling member is fully inserted in said sleeve and locked against rotation therein, a socket in the end of one of said coupling members and a projection extending from the end of the other coupling member in position to enter said socket when said second coupling member is fully inserted in said sleeve and said sleeve is in retracted position, a chamber between said sleeve and said first coupling member and communicating with the passage of said first coupling member in the coupled condition of said coupling members whereby the pressure of the fluid in said first coupling member is effective to urge said sleeve toward retracted position, and a spring in said chamber urging said sleeve toward retracted position.

WALLACE F. MITCHELL.

REFERENCES CITED

The following references are of record in the file of this patent:

UNITED STATES PATENTS

| Number | Name | Date |
| --- | --- | --- |
| 2,222,746 | Kamenarovic | Nov. 26, 1940 |
| 2,425,500 | Wiggins | Aug. 12, 1947 |